US009450670B1

(12) United States Patent
Fleischer et al.

(10) Patent No.: US 9,450,670 B1
(45) Date of Patent: Sep. 20, 2016

(54) POSITION SENSOR FOR A FAST STEERING MIRROR

(71) Applicant: AOptix Technologies, Inc., Campbell, CA (US)

(72) Inventors: Siegfried Fleischer, Campbell, CA (US); Glenn Scott Gibb, Jr., Campbell, CA (US); Yu Chun Chang, Campbell, CA (US); Howard Dando, Rio Del Mar, CA (US)

(73) Assignee: Aoptix Technologies, Inc., Campbell, CA (US)

( * ) Notice: Subject to any disclaimer, the term of this patent is extended or adjusted under 35 U.S.C. 154(b) by 16 days.

(21) Appl. No.: 14/447,971

(22) Filed: Jul. 31, 2014

(51) Int. Cl.
*H04B 10/11* (2013.01)
*H04B 10/112* (2013.01)
*H04B 10/40* (2013.01)

(52) U.S. Cl.
CPC ............. *H04B 10/11* (2013.01); *H04B 10/112* (2013.01); *H04B 10/1125* (2013.01); *H04B 10/40* (2013.01)

(58) Field of Classification Search
CPC .................... H04B 10/112; H04B 10/1125
See application file for complete search history.

(56) References Cited

U.S. PATENT DOCUMENTS

| | | | | |
|---|---|---|---|---|
| 5,539,562 A * | 7/1996 | Morioka | ............ | H04B 10/1125 398/131 |
| 6,384,944 B1 * | 5/2002 | Takayama | .......... | H04B 10/1125 398/121 |
| 6,464,364 B2 * | 10/2002 | Graves | .................. | G02B 26/06 359/224.1 |
| 6,701,093 B1 * | 3/2004 | Gotoh | ................ | H04B 10/1125 398/135 |
| 7,102,114 B2 * | 9/2006 | Graves | ...................... | G01J 9/02 250/201.9 |
| 2002/0109886 A1 * | 8/2002 | Barbier | ................ | G02B 6/4246 398/121 |
| 2003/0197910 A1 * | 10/2003 | Witt | ..................... | G02B 7/1821 359/200.7 |
| 2004/0202482 A1 * | 10/2004 | Usui | .................. | H04B 10/1125 398/156 |
| 2004/0208595 A1 * | 10/2004 | Mok | .................. | H04B 10/1125 398/128 |
| 2005/0265724 A1 * | 12/2005 | Sakanaka | ........... | H04B 10/1125 398/140 |

\* cited by examiner

*Primary Examiner* — Nathan Curs
(74) *Attorney, Agent, or Firm* — Fenwick & West LLP

(57) ABSTRACT

A free-space optical transceiver includes a repositionable mirror for receiving and sending light beams with another transceiver. To properly align the light beams, the position of the mirror is determined in using a position sensor. The position sensor is mounted within a base substructure that is coupled to a steerable mirror substructure containing the mirror. The position sensor reflects sensor light off of the mirror to determine the position of the mirror along two different axes. The position sensor includes an optical element for shaping the sensor light. The components of the position sensor are mounted to the base substructure such that alignment of the position sensor is not required. Further, by coupling the position sensor to the base substructure and not the steerable mirror substructure, the moment of inertia and center of gravity of the steerable mirror substructure is improved, thereby improving the steering responsiveness of the mirror.

20 Claims, 10 Drawing Sheets

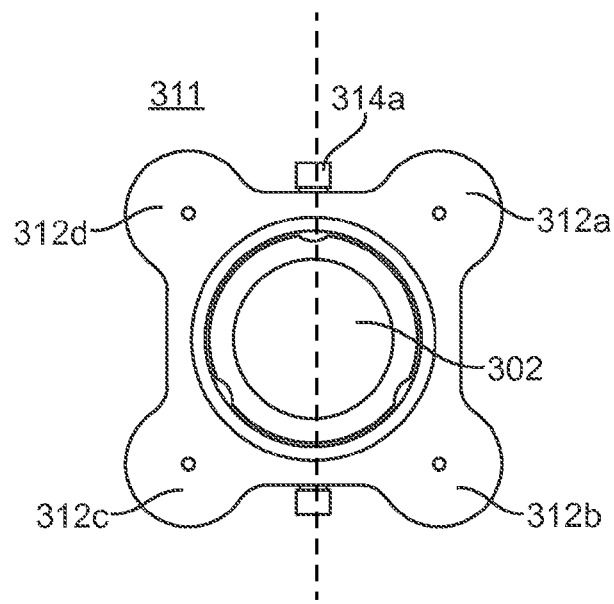
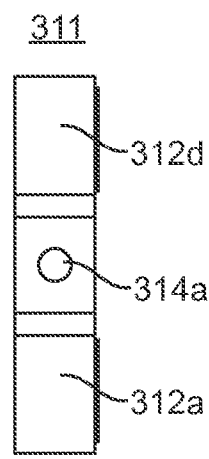
FIG. 4A  FIG. 4B
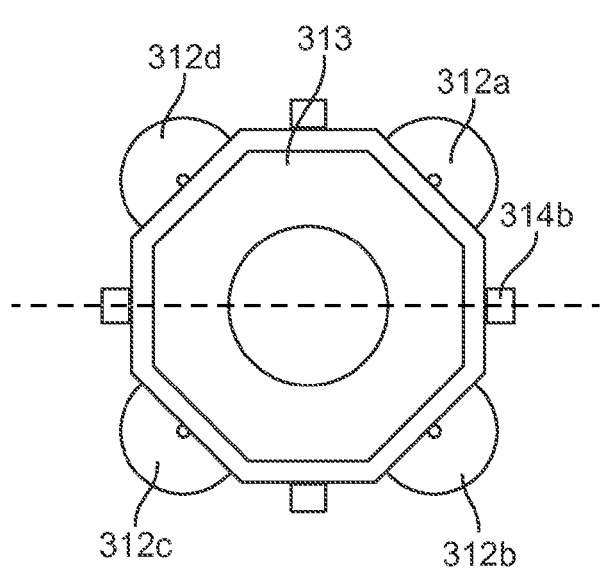
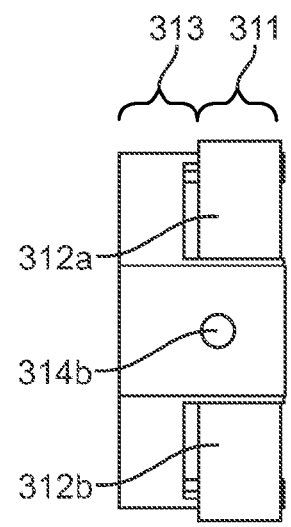
FIG. 4C  FIG. 4D

US 9,450,670 B1

POSITION SENSOR FOR A FAST STEERING MIRROR

BACKGROUND

The present disclosure relates generally to optical devices, and more specifically to optical devices including a repositionable mirror and an optical sensor.

With recent advances in technology, there is an increasing interest in the use of free-space optical (FSO) communications for various applications. Compared to other communications technologies, a FSO communications link can have advantages of higher mobility and compact size, better directionality (e.g., harder to intercept), faster set up and tear down, and/or suitability for situations where one or both transceivers are moving. Thus, FSO communications links can be used in many different scenarios, including in airborne, sea-based, space and/or terrestrial situations.

FSO transceivers generally need to be aligned with each other to exchange data owing to the narrow beam spread of their operating wavelengths. For example, a FSO transceiver operating at a wavelength of 1550 nm has a beam spread of approximately 0.01 degrees or less. When communicating over long distances in free space, for example on the order of 10 kilometers, accurate pointing is essential as the slightest misalignment can result in one transceiver not being able to receive the other's signal. Further, if the transceivers are mounted on a moving platform such as a communications tower, the tower can sway due to wind or other natural causes. Physical alignment of the transceiver can only partially address this issue. As a result, FSO communications systems have need for real-time beam steering systems that respond to rapid (as high as a few hundred hertz) change in the position of the transceiver or in the position of a received beam so that a transceiver can continue to communicate with a remote transceiver. However, depending upon their implementation, real time positioning sensors can have drawbacks that affect the performance of the transceiver.

BRIEF DESCRIPTION OF THE DRAWINGS

FIG. 4A is a top view of an inner gimbal of the beam steering assembly, according to one embodiment.

FIG. 4B is a side view of the inner gimbal, according to one embodiment.

FIG. 4C is a top view of an outer and the inner gimbal assembled together, according to one embodiment.

FIG. 4D is a side view of the outer and the inner gimbal assembled together, according to one embodiment.

The figures depict various embodiments of the present disclosure for purposes of illustration only. One skilled in the art will readily recognize from the following discussion that alternative embodiments of the structures and methods illustrated herein may be employed without departing from the principles described herein.

DETAILED DESCRIPTION

I. Overview

A position sensor for a free-space optical (FSO) transceiver is described that determines the angular position of a repositionable (e.g., tip/tilt) mirror in real-time, to provide constant feedback of the FSM angle in its local coordinate frame for use in repositioning the mirror to align the FSO transceiver with a remote transceiver. The FSO transceiver includes a base substructure comprising a mirror opening and a cavity comprising a first portion and a second portion both adjacent to the mirror opening and allowing FSO light to pass along a first optical axis and second optical axis, respectively. The base substructure is coupled to a steerable mirror substructure that includes a gimbal assembly and the mirror. The gimbal assembly rotates a center point about two different axes. The center of the mirror is positioned at the center point so as to substantially fill the mirror opening such that FSO light passing along the first optical axis reflects off the mirror along the second optical axis. The position sensor includes a printed circuit board (PCB) coupled to the base substructure. The PCB includes a light source oriented to emit sensor light towards the mirror and a detector oriented to receive sensor light reflected from the mirror. The position sensor also includes an optical element coupled to the base substructure. The optical element directs sensor light from the light source into the mirror and directs reflected sensor light from the mirror into the detector.

II. Free-Space Optical Transceiver

Figure 1:
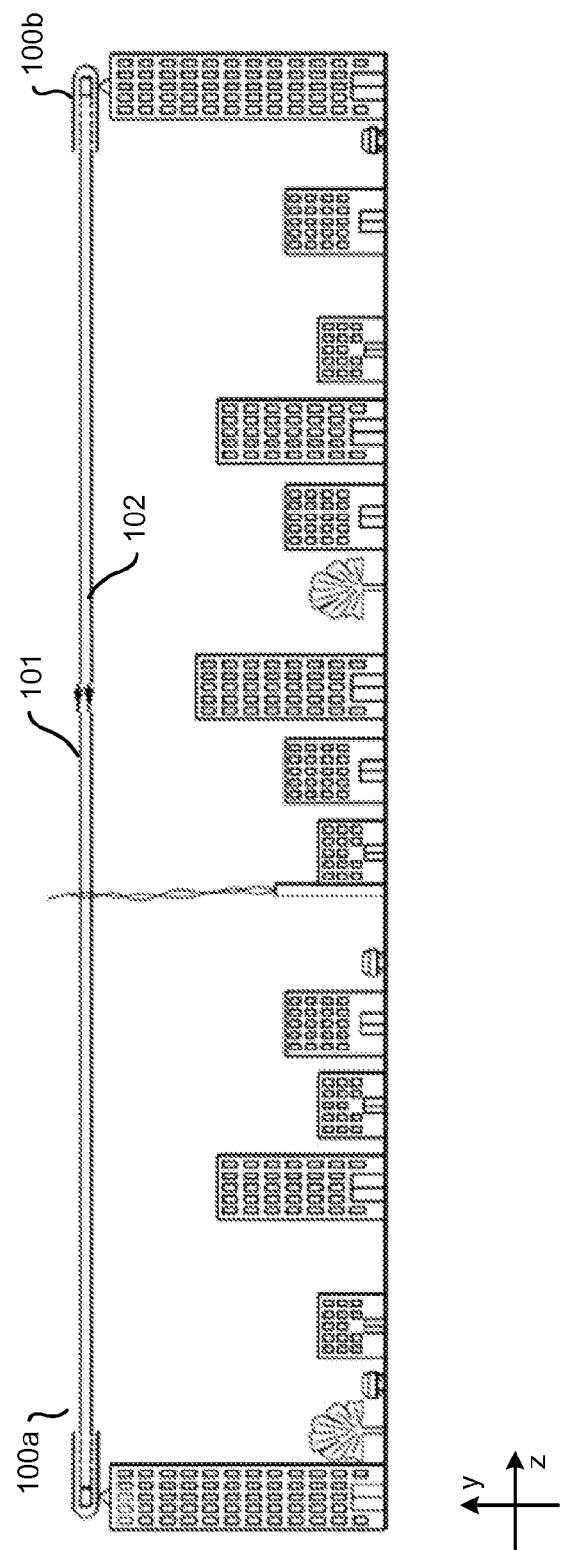
FIG. 1 is an illustration of a commercial communications network using two FSO transceivers to communicate through free space, according to one embodiment.

FIG. 1 is an illustration of a commercial communications network using two FSO transceivers 100 to communicate through free space, according to one embodiment. A FSO transceiver 100a located at a first cell site is configured to communicate with another FSO transceiver 100b at a second cell site located remotely from the first cell site. The transceivers 100 are located a distance away from each other and are oriented towards each other within line of sight. The distance between apparatuses may depend upon historical weather data for the area being serviced. For example, if the service area frequently experiences rain or fog, the distance between sites may be smaller than if these weather conditions are less frequent or severe. Often, an apparatus will be positioned at a prescribed height above ground to prevent interruption of line of sight due to building or landscape features. The apparatus may be land-based, maritime-based (i.e., mounted on a seaborne vessel), or airborne. Further detail regarding an example transceiver system including a FSO transceiver 100 is described in U.S. patent application Ser. No. 13/149,804, titled "Integrated Commercial Communications Network Using Radio Frequency and Free Space Optical Data Communication," which was filed on May 31, 2011, and is incorporated herein by reference in its entirety.

Figure 2:
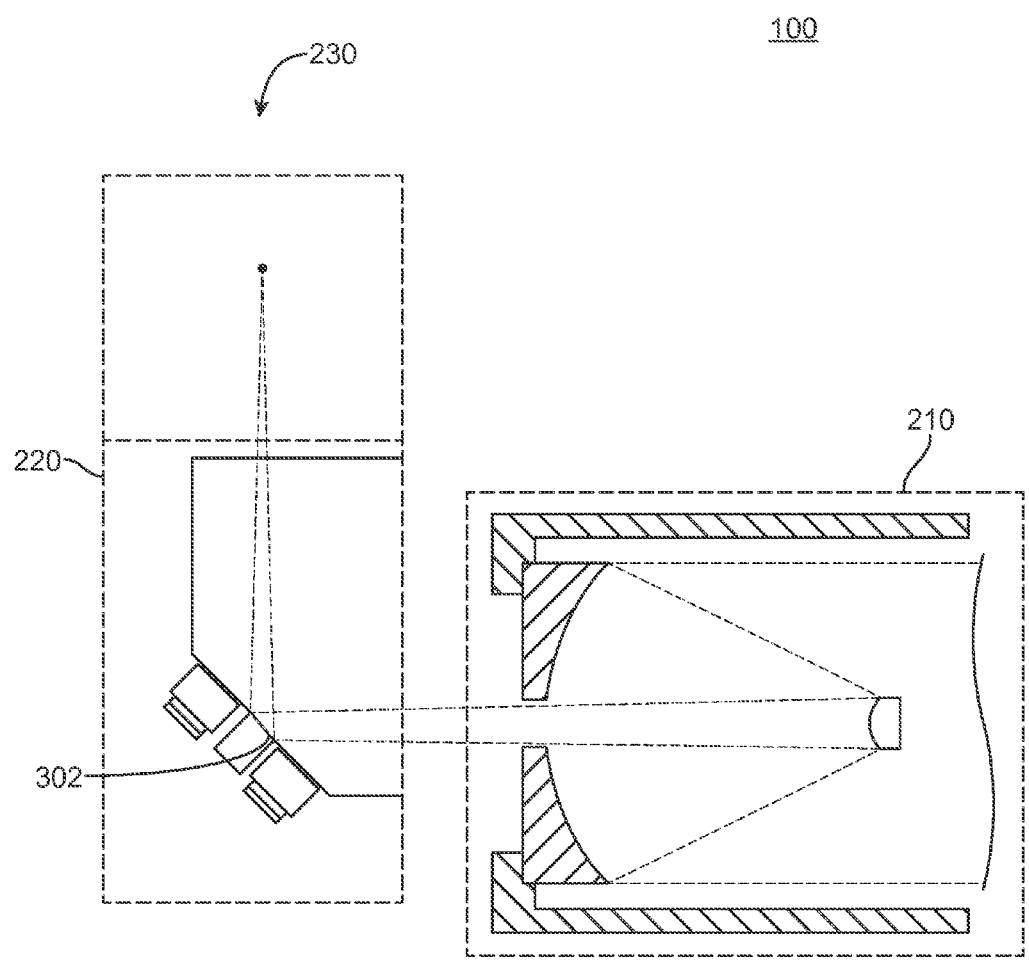
FIG. 2 is a cross sectional view of a portion of a FSO transceiver, according to one embodiment.

FIG. 2 is a cross sectional view of a portion of a FSO transceiver 100, according to one embodiment. The FSO transceiver 100 includes a telescope 210 and a beam steering assembly 220 that are physically coupled together. The FSO transceiver 100 also includes other "backend" 230 components which are not explicitly shown, for clarity. These backend components include an electrical controller for the beam steering assembly 220, a FSO light emitter and a FSO light detector for transmitting and receiving data, respectively, as well as other related optical, mechanical, and are electrical components. Here FSO light refers to the light that is used to exchange data with a remote transceiver 100b and is distinguished from other kinds of light such as sensor light, described further below.

FSO light incident on the telescope 210 from a remote transceiver 100b is collected and relayed by telescope 210 into the beam steering assembly 220. An example of a telescope 210 suitable for use in the transceiver 100 is described in U.S. patent application Ser. No. 13/799,923, which is incorporated by reference herein in its entirety.

The beam steering assembly 220 directs the light towards the backend 230 of the FSO transceiver for detection and processing. The beam steering assembly 220 includes a mirror 302 such as a deformable mirror. The mirror 302 is mounted in the beam steering assembly 220 so that it can be rotated in real time, thereby helping guide the incident FSO light onto the FSO light detector. Examples of deformable mirrors suitable for use as the mirror 302 are described in U.S. Pat. Nos. 7,102,114, 7,406,263, 6,721,510, 6,464,364, and 6,879,89, all of which are incorporated by reference herein in their entirety. In the reverse direction, FSO light emitted from the FSO light emitter is directed into the beam steering assembly 220 towards the mirror 302. The mirror 302 redirects the FSO light towards the telescope 210, which relays the FSO light towards the remote transceiver 100b.

In both the inbound and outbound cases, the mirror 302 is able to be rotated in real time to respond to motion of the transceiver 100 or to motion of the received FSO light to ensure that the local 100 and remote transceiver 100b remain in signal contact. Specifically, a controller (not shown) that is part of the backend 230 of the transceiver 100 analyzes inbound FSO light and local knowledge of the motion of the transceiver 100 (for example, as provided by accelerometers and/or gyroscopes) to determine how the position of the mirror 302 should be adjusted.

Figure 3A:
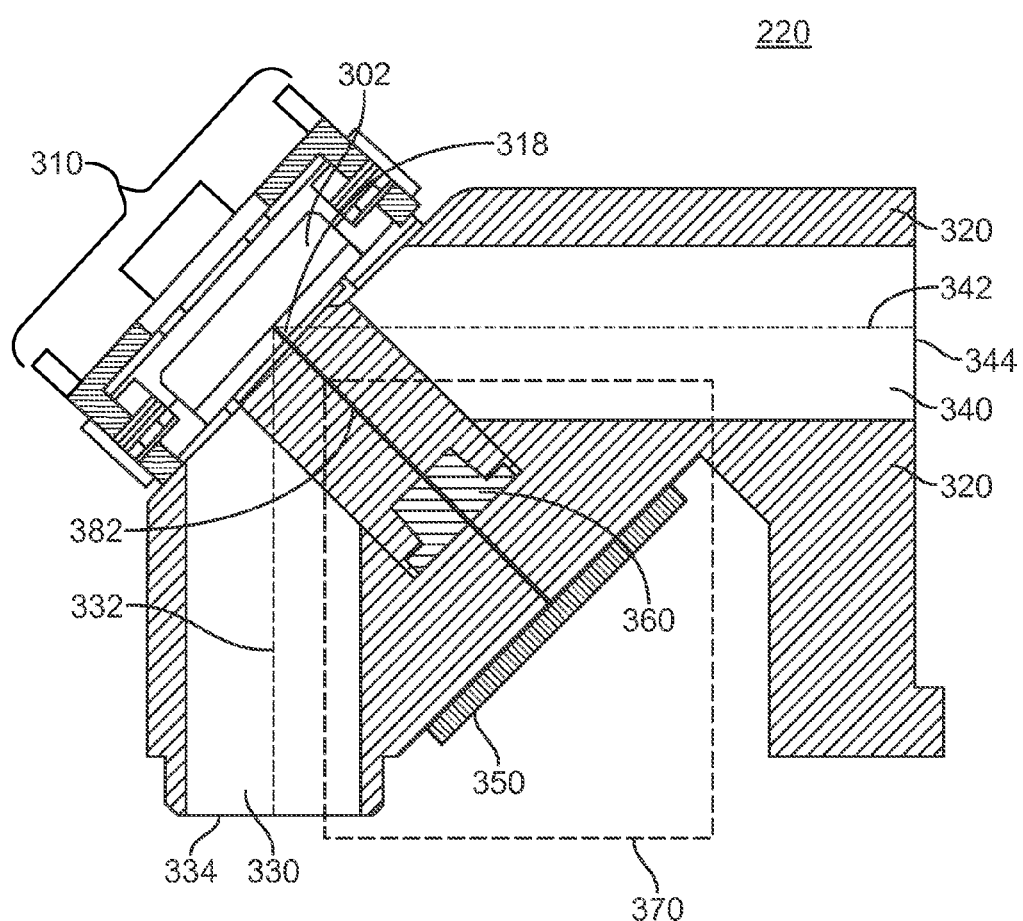
FIG. 3A is a cross sectional view of a beam steering assembly of a FSO transceiver, according to one embodiment.
Figure 3B:
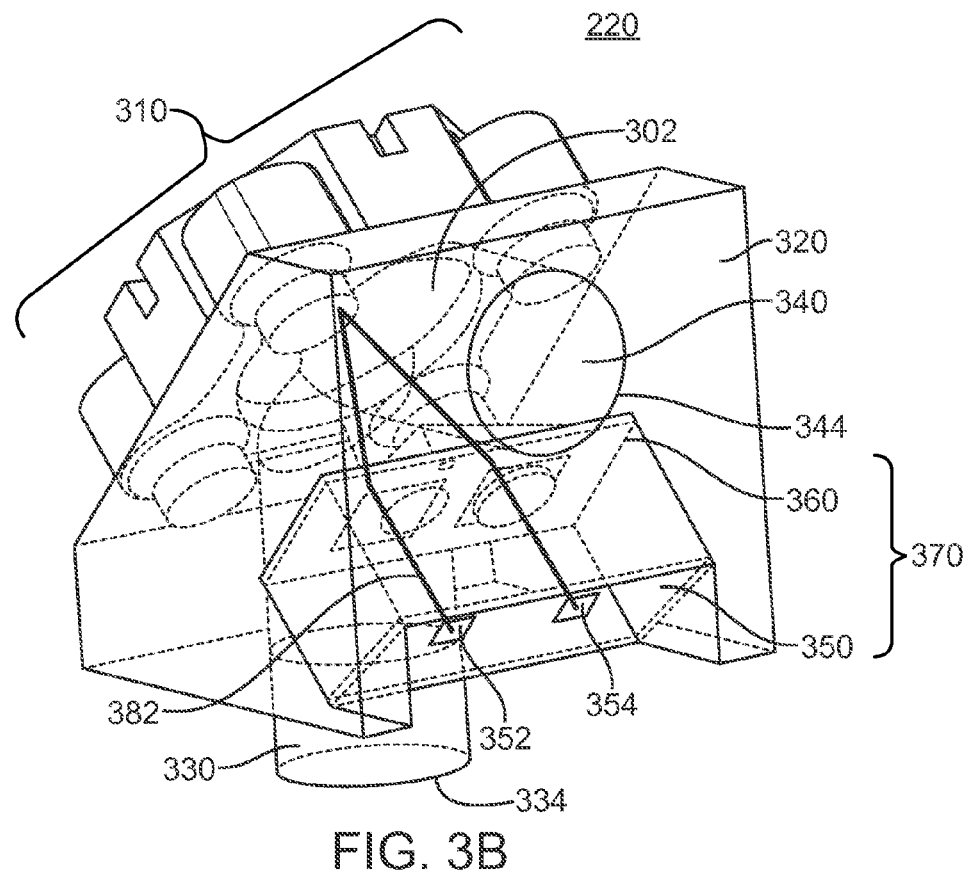
FIG. 3B is a perspective view of the beam steering assembly of a FSO transceiver, according to one embodiment.
Figure 3C:
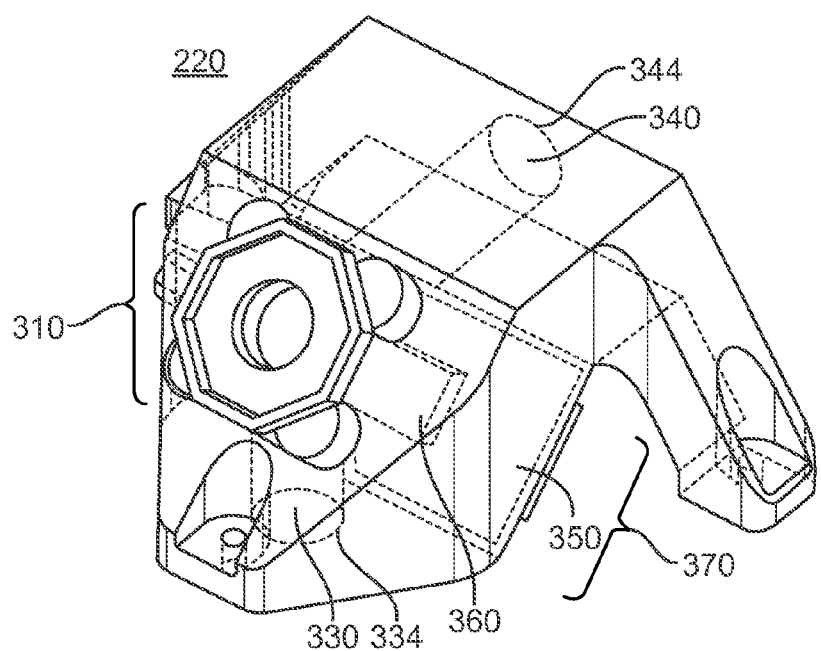
FIG. 3C is another perspective view of the beam steering assembly of a FSO transceiver, according to one embodiment.

In order to do this, the beam steering assembly 220 also includes a position sensor for detecting the position of the mirror 302, as shown in FIGS. 3A-3C. Accurate knowledge of the current position of the mirror 302 is important for determining how the mirror 302 should be repositioned to achieve and/or maintain transceiver alignment.

III. Beam Steering Assembly

FIG. 3A is a cross sectional view of a beam steering assembly 220 of a FSO transceiver, according to one embodiment. FIG. 3B is a perspective view of the beam steering assembly 220 of a FSO transceiver, according to one embodiment. FIG. 3C is another perspective view of the beam steering assembly 220 of a FSO transceiver, according to one embodiment. The beam steering assembly 220 is described immediately below with respect to all three of these FIGS., as each shows a different point of view of the same exemplary embodiment of a beam steering assembly 220.

The beam steering assembly 220 includes a steerable mirror substructure 310 including the mirror 302, a base substructure 320, and a position sensor 370. The steerable mirror substructure 310 and the position sensor 370 are both physically coupled to the base substructure 320. In one embodiment, the total mass of the entire beam steering assembly 220 is less than two pounds.

III.A Base Substructure

The base substructure 320 is a single piece of material including several cavities, associated openings, and mounting points for other physical substructures. The base substructure 320 includes a hollow cavity to exchange FSO light between the telescope 210 and the backend 230 of the transceiver 100. The hollow cavity includes entrance and exit openings for FSO light traveling through the base substructure 320 as well as a mirror opening 318 for the mirror 302. The entrance and exit openings are located on two different sides of the base substructure 320 from each other. The terms entrance and exit are relative given that light may be traveling either direction between the telescope 210 and backend 230. To avoid confusion, these openings may also be referred to as the telescope opening 334 and the backend opening 344.

The hollow cavity may be subdivided into two portions (which may themselves each be referred to as cavities), a first cavity 330 (or telescope cavity 330) optically coupled to the telescope opening 334, and a second cavity (or backend cavity 340) optically coupled to the backend opening 344. The first 330 and second 340 cavities are optically coupled to each other, and are both optically adjacent to the mirror opening 318 where they are optically coupled.

The first 330 and second 340 cavities are oriented along a first optical axis 332 (or telescope axis) and a second optical axis 342 (or backend axis), respectively. The first 332 and second 342 optical axes represents the general direction of travel of FSO light through the cavities of the base substructure 320. In practice, FSO light will typically travel along these optical axes to within a few degrees, with some variation due to motion of the remote transceiver and/or due to the current position of mirror 302.

The first 332 and second 342 optical axes intersect and form an angle between each other. This angle is generally between 60-150 degrees, and in some cases is 90 degrees. Generally, the first 330 and second 340 cavities are sufficiently large in size at all points along the optical axis within the base substructure 320 to allow light to pass through without reflecting or being absorbed by any sidewall of the cavity. In one embodiment, this is accomplished by both the first 330 and second 340 cavities being sufficiently wide relative to their lengths (e.g., in either cylindrical or cuboid shape) such that the FSO light passing through the cavity can travel at an angle of plus or minus 4 degrees relative to the optical axis of the cavity without impacting a sidewall of the cavity.

III.B Steerable Mirror Substructure

The beam steering assembly 220 generally, and the steerable mirror substructure 310 including mirror 302 specifically, redirects FSO light between the first 330 and second 340 cavities of the base substructure 320 using the mirror 302. To accomplish this, the mirror 302 is physically coupled to the steerable mirror substructure 310, and the steerable mirror substructure 310 is physically coupled to the base substructure 320 such that the center of the mirror 302 is positioned at or near the center of the mirror opening 318. Further, the mirror opening 318 is positioned such that at least some portion of the surface of the mirror 302 (e.g., the center, though this is not necessarily the case) intersects both the first 332 and second 342 optical axes.

The exact angle of the redirection of FSO light is based on the position of the mirror 302 along two axes, as well as based on the shape of the mirror 302 if the mirror is a deformable mirror. To reposition the mirror 302, the steerable mirror substructure 310 includes a gimbal assembly that is physically coupled to the mirror 302. The gimbal assembly rotates the mirror 302 about its center. The gimbal assembly is capable of rotating the mirror 302 around two separate axes simultaneously and independently.

FIGS. 4A-4D illustrate an exemplary gimbal assembly as well as the inner 311 and outer 313 gimbals that make up the gimbal assembly according to one embodiment. The inner 311 and outer 313 gimbals each rotate the mirror 302 about a different axis. Each gimbal includes an even number of voice coils, where each voice coil acts as a linear motor where under an applied current the voice coil causes a permanent magnet surrounded by a coil to change position. The permanent magnet is physically coupled to the base substructure 320 and the coil is physically coupled to the steerable mirror substructure 310, or vice versa. One half of the voice coils of a given gimbal is located on an opposite side of the axis of rotation for that gimbal from the other half. Rotation is achieved by applying a positive voltage or current to one half of the voice coils, and an equal and opposite (i.e., negative) voltage or current to the other half of the voice coils. In one embodiment, the inner gimbal assembly 311 may be physically coupled to the first two voice coils, and the outer gimbal assembly 313 may be physically coupled to the second two voice coils, or alternatively both the inner 311 and outer 313 gimbal assemblies may each be attached to all four voice coils.

FIG. 4A illustrates a top view of the inner gimbal 311, where the voice coils 312 are circular structures located at the four corners of the physical structure of the inner gimbal. The inner gimbal 311 uses the voice coils to rotate the mirror 302 about a first axis 314a. FIG. 4B illustrates a side view of the inner gimbal 311 about the first axis 314a such that voice coils 312a and 312d are shown. In one embodiment, mirror 302 is mounted in the center of the inner gimbal 311.

FIG. 4C illustrates a top view of the inner 311 and outer 313 gimbals together. The outer gimbal 313 uses the voice coils to rotate the mirror about a second axis 314b. FIG. 4D illustrates a side view of the inner 311 and outer 313 gimbals together about the second axis 314b such that voice coils 312a and 312b are shown.

In one embodiment, the gimbal assembly can rotate up to 2.5 degrees in either direction along either axis and can rotate up to 1.88 degrees in either direction along both axes simultaneously. Each gimbal is capable of achieving a peak acceleration rate of 1560 radians per second squared.

III.C Position Sensor

Returning to FIGS. 3A-3C, the beam steering assembly 220 includes the position sensor 370 for determining the position of the mirror 302 in real time. The position sensor 370 includes a light source 352, a detector 354, a printed circuit board (PCB) 350, and an optical element 360. The light source 352 and detector 354 are both physically and electrically coupled to the PCB 350. Both the PCB 350 and the optical element 360 are physically coupled to the base substructure 320.

The (angular) position sensor 370 detects the position of the mirror 302 by causing sensor light 382 (rather than FSO light) to be emitted from the light source 352 towards the mirror 302. The sensor light 382 passes through a first lens of the optical element 360, is reflected by the mirror 302, and then travels back through a second lens of the optical element 360 before being incident on the detector 354. The sensor light 382 incident on the detector 354 is processed using electrical circuits to determine the position of the mirror 302.

The base substructure 320 includes an interior mounting cavity of sufficient size to allow the sensor light 382 to travel this path without impacting any side wall of the base substructure 320. The mounting cavity in which the sensor light 382 travels is optically coupled to both of the first 330 and second 340 cavities. This mounting cavity is further shaped to fit the molded optical element 360, such that the molded optical element 360 can be physically coupled to base substructure 320 in only a single position. Similarly, the base substructure 320 is shaped to fit the PCB 350, such that the PCB 350 can be physically coupled to the base substructure 320 in only a single position. This confers a major benefit onto the position sensor 370, as it removes the need for any part of the position sensor 370 to be aligned with any other part or with the mirror 302. This reduces the complexity of the overall design of the beam steering assembly 220 and removes a potential source of error.

Mounting the position sensor 370 to the base substructure 320 also has other benefits. Mounting the position sensor 370 to the base substructure 320 rather than the steerable mirror substructure 310 reduces the overall weight of the steerable mirror substructure 310. This allows for a reduced and more precise moment of inertia for the gimbal assembly, resulting in faster, more precise motion of the mirror 302. Additionally, some other components of the position sensor 370 that are not shown, such as wires that couple to the PCB 350, may not necessarily be fixed in place at all times. If the position sensor 370 were instead physically coupled to the steerable mirror substructure 310, the position of the wires may be unbalanced and/or may shift during operation or vary from transceiver to transceiver, thereby adversely affecting the center of gravity and moment of inertia of the gimbal assembly. By instead mounting the position sensor 370 to the base substructure 320, this problem is avoided. This also improves general reliability as there is no repeated motion of wires that can serve as a potential point of failure.

The position sensor 370 is mounted to the base substructure 320 such that the FSO light and the sensor light 382 both reflect off of the same side of the mirror 302. The position sensor 370 is mounted with respect to the first 330 and second 340 cavities such that the angle through which the FSO light is redirected by the mirror 302 (e.g., 90 degrees) is wider than the angle through which the sensor light 382 travels when reflected by the mirror 302. In one embodiment, the angle between the incident or reflected sensor light 382 and the normal of the mirror 302 is less than 45 degrees. Such a steep angle of incidence and reflection reduces sensitivity to small changes in the mirror's position 302 relative to larger angles of incidence and reflection. However, using a steep angle of incidence and reflection from the mirror 302 allows for a more compact construction of the base substructure 320 and simplifies the construction of the position sensor 370 as further described below.

Figure 3D:
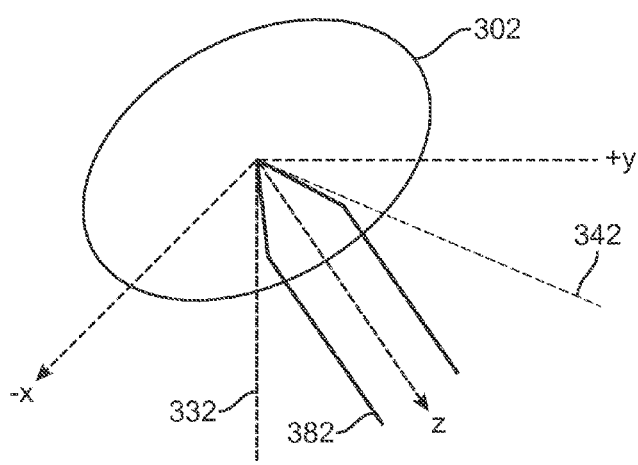
FIGS. 3D-3F illustrate optical axes and optical paths within the beam steering assembly of a FSO transceiver, according to one embodiment.
Figure 3E:
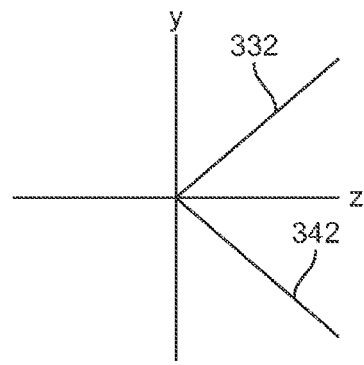
Figure 3F:
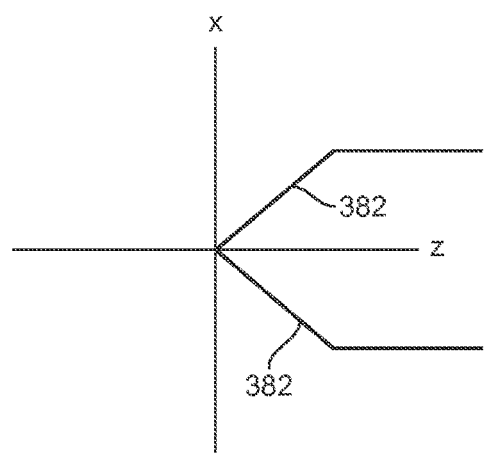

FIG. 3D illustrates the sensor light 382 optical path relative to the FSO light optical path according to one embodiment. A coordinate system may be defined such that the mirror is in the X-Y plane, and the Z is the normal to the mirror. The FSO light travels along the optical axes 332 and 342 within the Y-Z plane, and sensor light 382 travels in the X-Z plane primarily (with some translation in the Y plane). FIGS. 3E and 3F illustrate the FSO light's 332 and 342 optical path as well as the sensor light's 382 optical path through the X-Z, X-Y, and Y-Z planes. The angle of the sensor light 382 with the respect to the X axis may vary depending upon the implementation. The angle of the sensor light 382 with respect to the Z axis is less than 45 degrees as described above.

IV. Optical Element

Figure 5A:
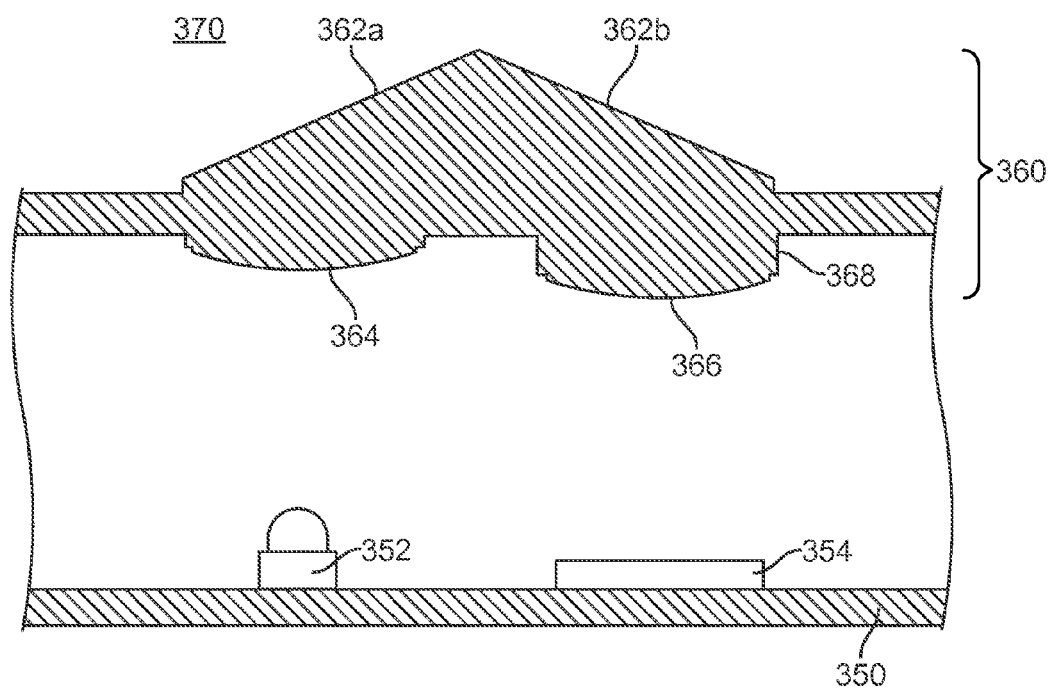
FIG. 5A is a side view of a position sensor, according to one embodiment.
Figure 5B:
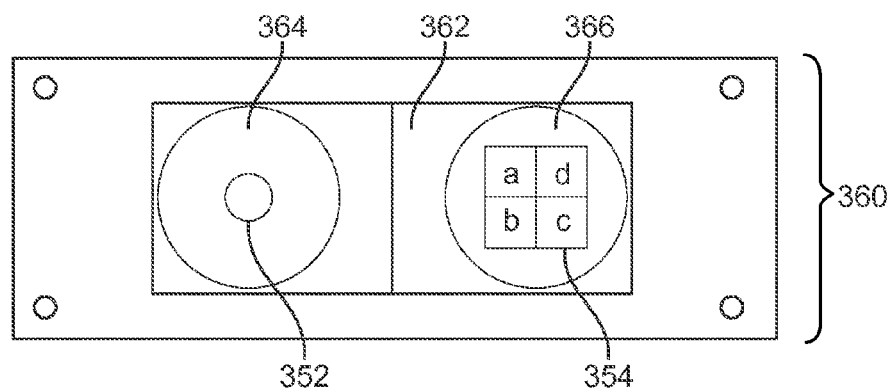
FIG. 5B is a top view of a molded optical element, according to one embodiment.
Figure 6:
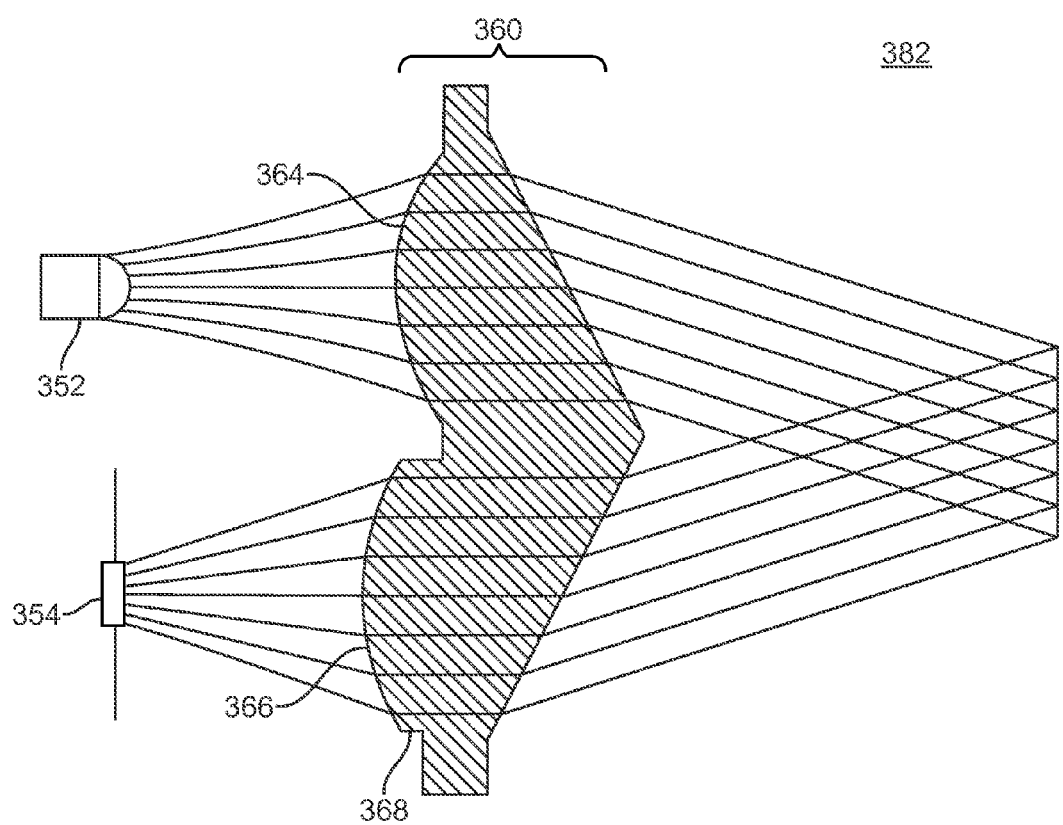
FIG. 6 is a ray trace diagram of an optical path of sensor light in the beam steering assembly, according to one embodiment.

FIG. 5A is a side view of a position sensor 370, according to one embodiment. FIG. 5B is a top view of the optical element 360, according to one embodiment. FIG. 6 is a ray trace diagram of the optical path of sensor light 382 in a beam steering assembly 220, according to one embodiment. The optical element 360 of the position sensor is described immediately below with respect to all three of these FIGS., as they operate in concert with each other.

The optical element 360 is a single molded piece of material that includes a first lens 364 and a second lens 366 on a lower surface facing the PCB 350. The first lens 364 is configured to receive sensor light 382 emitted from the light source 352 and to help collimate the sensor light from the source 364. This helps ensure that more light is collected and is redirected to be incident upon the mirror 302. This also moves the apparent location of the source 352 infinitely far away. The first lens 364 is useful particularly because the light source 352 may be a relatively low cost component, and as a result it may have only a limited ability to direct light in the desired direction. Thus, the first lens 364 also functions to capture as much of the sensor light 382 emitted from the light source 352 as possible and redirect it towards the mirror 302 for reflection.

After passing through the first lens 364, the sensor light 382 may be redirected by a first portion of an upper surface 362a of the optical element 360 facing the mirror 302. The redirection is due to a difference in the index of refraction between the optical element and air, as well as due to the orientation (or angle) of the upper surface 362a relative to the mirror 302. For example, the upper surface 362a may be formed at an angle with respect to the light source 352 and/or mirror 302. The sensor light 382 then reflects off of the mirror 302, and travels back towards another portion of the upper surface 362b of the optical element 360. Again, the sensor light 382 is redirected upon entering the optical element 360. The angle of the second portion of the upper surface 362b may be the reverse of the angle of the first portion 362a.

The sensor light 382 then passes through the second lens 366 and travels to the detector 354. The second lens 366 has different optical properties than the first lens 364. The second lens 366, in contrast to the first lens 364, has optical properties designed to reimage the sensor light 382 from the light source 352 from infinity and focus it to create a defocused spot of a desired size onto the detector 354. Both first 364 and second 366 lenses together set the effective focal length. The focal length of the second lens 366 determines the distance the spot moves per degree of motion of the mirror 302. The spot size is determined by the amount of defocus, that is the distance of the detector from the focal point of the second lens 366.

The optical element 360 may also include a protrusion 368 adjacent to either the first lens 364 or the second lens 366 (illustrated). The protrusion 368 is designed to match a similar hole (not shown) in the base substructure 320. The protrusion 368 is configured to assist in assembly of beam steering assembly 220, such that it is clear during assembly which direction the optical element 360 is to be slotted into the base substructure 320.

In addition to its focusing and light shaping functions, the optical element 360 has other benefits. Using the optical element, all sensor light 382 manipulations along the sensor light 382's optical path length, other than the reflection by the mirror 302, are performed by the optical element 360. As the light source 352 and detector 354 are both mounted to a common PCB 350, the position sensor 370 includes only two physically separate components 350 and 360 that need to be coupled during assembly of the transceiver 100. As described above, the base substructure 320 is shaped to receive each of these components in exactly a single position. Consequently, no alignment of the optical path is needed once the beam steering assembly 220 is constructed. This simplifies assembly and verification.

In one embodiment, the optical element 360 has optical properties as described below in Table 1.

TABLE 1

| Lens | | | |
|---|---|---|---|
| Surface | Radius (mm) | Thickness (mm) | Min Clear Aperture (mm) |
| 364 | 10 | 2.55 | Circle diameter: 11 |
| 366 | 9.3 | 3.65 | Circle diameter: 11 |
| Prism | | | |
| Surface | Radius (mm) | Angle | Min clear Aperture (mm) |
| 362a | Flat | 154.3 +/- 1 | Ellipse Axes: 11 minor, 12.20 major |
| 362b | Flat | 154.3 +/- 1 | Ellipse Axes: 11 minor, 12.20 major |

In this embodiment, the surface finish on the top surface 362 of the optical element is a fine grind finish. The optical element may be constructed using Zeonex E48R or F52R, both of which are advantageous due to having very low water absorption, which minimizes variance in focal length due to water vapor intrusion into the system.

In an alternative embodiment, rather than being a single molded piece, the optical element comprises multiple separate pieces, each performing one of the functions described above. For example, the optical element could be implemented as two separate lenses in place of 364 and 366, and two separate prisms in place of top surfaces 362a and 362b. In yet another alternative embodiment, the optical element 360 includes only a single lens, and the sensor light 382 is relay-imaged directly onto the detector 354. In the simplest configuration, the single lens could be a pinhole, however light collection efficiency would be poor. More complex lenses may also be used.

V. Mirror Angle Detection and Position Sensor Circuit

Figure 7A:
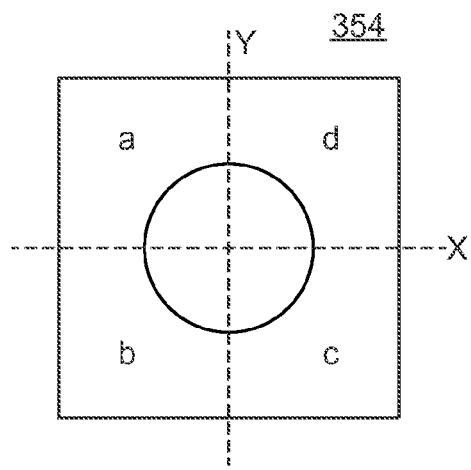
FIGS. 7A-7C are illustrations of example sensor light spots as received by a detector in the position sensor, according to one embodiment.
Figure 7B:
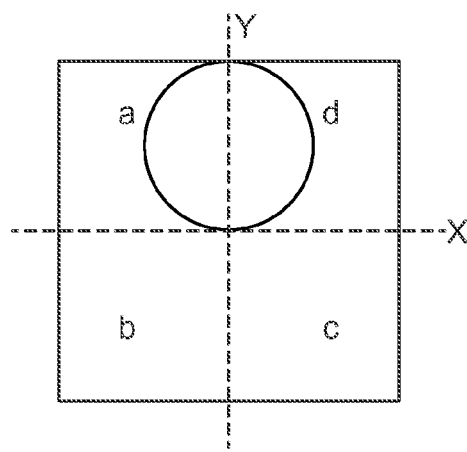
Figure 7C:
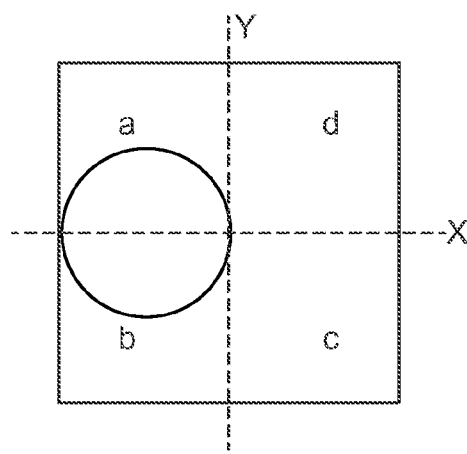

FIGS. 7A-7C are illustrations of example sensor light 382 spots as received by a detector 354 in the position sensor, according to one embodiment. In the illustrated embodiment, detector 354 is a quad cell having four quadrants a-d. The angle of the mirror 302 along two different axes, for example an X axis and a Y axis, can be determined based on the amount of sensor light 382 incident on the four quadrants of the quad cell. Generally, the distance offset $X_o$ of the mirror 302 along the X direction is given by $X_o=[(a+b)-(c+d)]/[a+b+c+d]$ where a, b, c, and d are the amounts of sensor light 382 incident on the corresponding quadrant of the quad cell. Similarly, the distance offset $Y_o$ of the mirror 302 along the Y direction is given by $Y_o=[(b+d)-(a+c)]/[a+b+c+d]$. These offsets may be converted into angles based on the distance between the mirror and the detector. FIG. 7A illustrates an example spot of sensor light 382 on the detector 354 with the mirror 302 at a neutral position (e.g., the mirror is at the center of its range of motion along both axes). FIG. 7B illustrates another example spot of sensor light 382 on the detector 354 with the mirror 302 offset along the Y axis (e.g., 4 degrees) but at the center of its range of motion along the X axis. FIG. 7C illustrates another example spot of sensor light 382 on the detector 354 with the mirror 302 offset along the X axis (e.g., 4 degrees) but at the center of its range motion along the Y axis. In one embodiment the quad cell is a 5×5 mm, and the image size as shaped by the second lens 366 is 2.5 mm in diameter.

Figure 8:
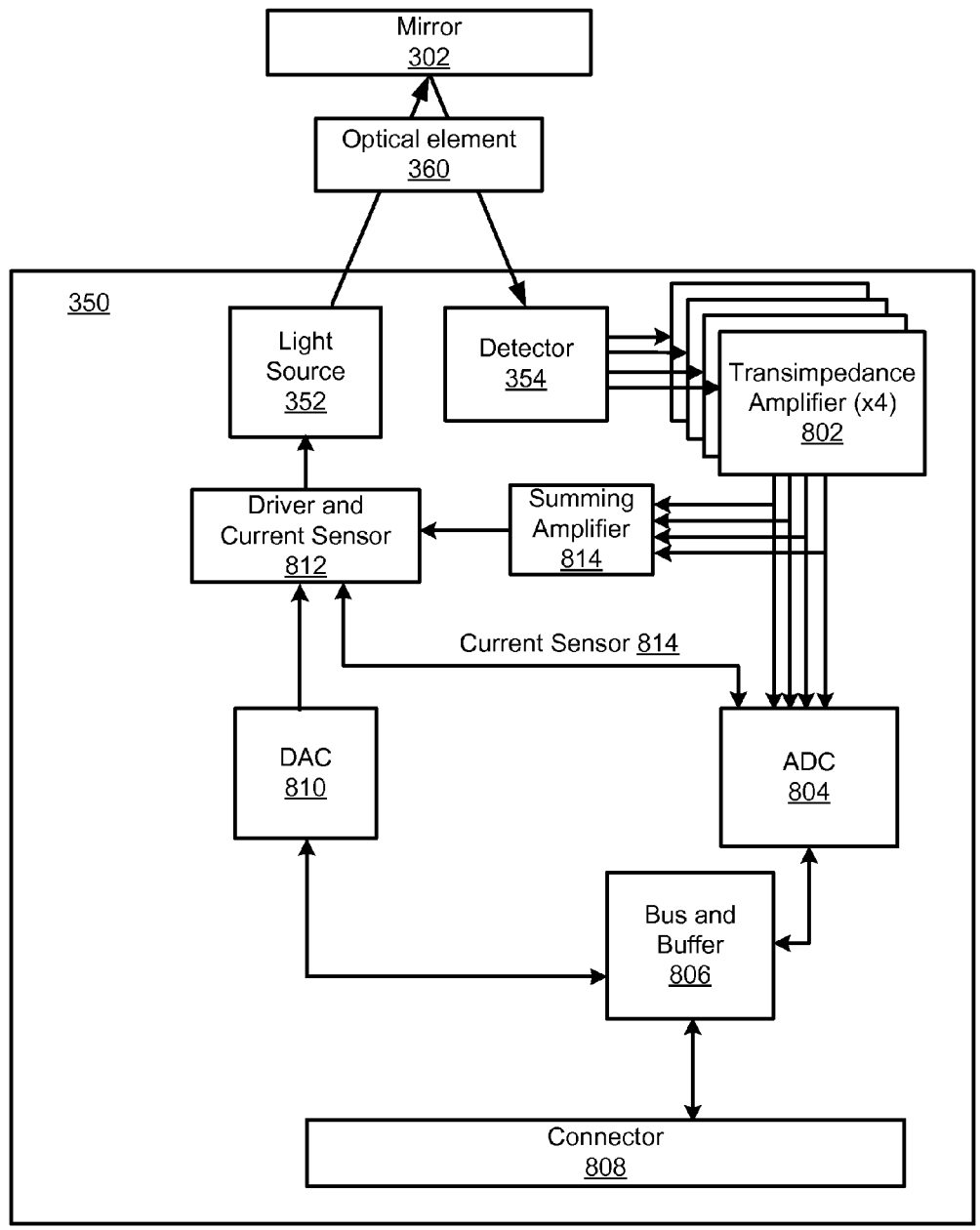
FIG. 8 is a block diagram of a position sensor circuit, according to one embodiment.

FIG. 8 is a block diagram of a position sensor circuit, according to one embodiment. The position sensor circuit includes the electrical components that provide the measurement of the mirror position (or angle) as detected by the position sensor 370 to the remainder of the transceiver for use in repositioning the mirror 302 to create or maintain a connection with a remote transceiver 100b. In the embodiment illustrated in FIG. 8, the position sensor circuit is embodied using the printed circuit board 350, and includes the light source 352, the detector 354, four transimpedance amplifiers 802, an analog to digital converter (ADC) 804, a bus and/or buffer 806, a connector 808, a digital to analog converter (DAC) 810, a light source driver and current sensor 812, and a summing amplifier 814.

As described above, the light source 352 illuminates the mirror 302, and the detector 354 reads out the amount of light impinging on each quadrant of the detector's 354 quad cell. The detector 354 outputs the amount of light on each quadrant as an analog voltage value, which each of the transimpedance amplifiers 802 converts to a current. These currents are fed to the ADC 804 which converts them into digital values. The ADC outputs the digital currents to a bus and buffer 806 that communicates them to the remainder of the transceiver over a connector 808. For example, the digital currents representing the amount of light on each quad cell quadrant may be used to calculate the mirror position along two separate axes, which in turn may be used by a gimbal control circuit (not shown) to reorient the mirror 302 in a desired direction.

The position sensor circuit may also use the quad cell quadrant currents to determine the power level of the light source 352 in a closed loop manner (i.e., without needing external input on the power level of the light source 352 from the bus 806). For example, the digital currents may also be passed by the bus 806 to a DAC 810 which provides them in analog format to a driver and current sensor 812 for the light source 352. Alternatively, the current sensor 812 may read out the current values directly from the ADC 804 and/or the transimpedance amplifiers 802 through summing amplifier 814. The driver 812 uses the sensed currents to control the amount of current provided to the light source 352 in order to keep the sum of the total current/total received power at the detector 354 constant.

In an alternative embodiment, rather than using a detector 354 that is a quad cell, the detector 354 may instead be a position sensitive detector (PSD). If a PSD is used, the defocus introduced by the second lens 366 would not be used, and instead the second lens 366 (or single lens, if only one lens is used) would be configured to focus the sensor light 382 onto the surface of the PSD.

VI. Additional Considerations

Some portions of this description use the term coupling, which refers to two components being connected together either directly or indirectly through one or more intermediate components. Examples of such connections include physical couplings indicating physical contact between the components, electrical couplings indicating connection through electrical circuits, and optical couplings indicating a connected optical path through free space, cavities, or other intermediate optical components such as mirrors, filters, and lenses.

Some portions of this description describe the embodiments in terms of algorithms and symbolic representations of operations on information, such as the determination of mirror position based on digital currents of quad cell quadrants. These algorithmic descriptions and representations are commonly used by those skilled in the data processing arts to convey the substance of their work effectively to others skilled in the art. These operations, while described functionally, computationally, or logically, are understood as capable of being implemented by electrical circuits, field programmable gate arrays, application specific integrated circuits (ASICs), and computer processors along with computer program code configured to run on the processors.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. For example, although the beam steering assembly 220 and included position sensor 370 discussed above have been described for use in the context of a FSO transceiver, the beam steering assembly 220 and included position sensor 370 can also be used in other steered light beam applications, such as an scanners for LIDAR, in image scanners, and for laser jitter stabilization. Accordingly, the disclosure of the embodiments is intended to be illustrative, but not limiting, of the scope of the invention, some embodiments of which are set forth in the following claims.

What is claimed is:

1. An optical device comprising:
  a base substructure comprising a mirror opening and a cavity comprising a first portion and a second portion both adjacent to the mirror opening and allowing steered light to pass along a first optical axis and second optical axis, respectively;
  a steerable mirror substructure coupled to the base substructure and comprising:
    a gimbal assembly configured to rotate two different axes about a center point; and
    a mirror coupled to a gimbal assembly, a center of the mirror positioned at the center point, the mirror positioned so as to substantially fill the mirror opening such that steered light passing along the first optical axis reflects from the mirror along the second optical axis;
  a printed circuit board (PCB) coupled to the base substructure and comprising:
    a light source coupled to the PCB and oriented to emit sensor light towards the mirror; and a detector coupled to the PCB and oriented to receive sensor light reflected from the mirror; and an optical element coupled to the base substructure, the optical element directing sensor light from the light source to the mirror, and directing reflected sensor light from the mirror to the detector.

2. The optical device of claim 1, wherein the steerable mirror substructure and the PCB are coupled to the base substructure such that the steered light reflects from a same side of the mirror as the sensor light.

3. The optical device of claim 1, wherein an angle formed between the first and second directions is larger than an angle formed between sensor light incident on the mirror and sensor light reflected from the mirror.

4. The optical device of claim 1, wherein the first and second directions form an angle between 60 and 150 degrees.

5. The optical device of claim 1, wherein the first and second portions are adjacent to an opening in the base substructure allowing sensor light to pass between the mirror and the optical element.

6. The optical device of claim 1, wherein the gimbal assembly comprises an inner gimbal configured to control rotation about a first axis passing through the center point, and an outer gimbal configured to control rotation about a second axis also passing through the center point that is perpendicular to the first axis.

7. The optical device of claim 1, wherein the gimbal assembly comprises voice coils to rotate the mirror.

8. The optical device of claim 1, wherein the mirror comprises a deformable mirror.

9. The optical device of claim 1, wherein the base substructure comprises a mounting cavity for the optical element, the mounting cavity including a mounting surface shaped to fit a shape of the optical element.

10. The optical device of claim 9, wherein the base substructure is further shaped to match the PCB such that the PCB can be mounted in a single position only.

11. The optical device of claim 1, wherein the printed circuit board (PCB) includes a position sensor circuit for operating the light source and the detector and providing an output of the sensor light received by the detector.

12. The optical device of claim 11 wherein the position sensor circuit further includes a closed loop power control circuit for the light source.

13. The optical device of claim 1, wherein the optical element comprises two different lenses having different optical properties.

14. The optical device of claim 13, wherein a first one of the lenses is positioned and shaped to redirect sensor light emitted from the light source towards the mirror.

15. The optical device of claim 14, wherein a second one of the lenses is positioned and shaped to transmit sensor light reflected from the mirror towards the detector, and comprises a focal length that is defocused with respect to the detector, thereby forming a spot on the detector.

16. The optical device of claim 13, wherein the detector is a quad cell that determines an angle of the mirror along two different axes based on a position of a spot of sensor light received at the quad cell.

17. The optical device of claim 1, wherein the optical element comprises a single lens.

18. The optical device of claim 1, wherein the optical element comprises an angled top surface comprising two portions with different angles relative to each other.

19. The optical device of claim 18, wherein a first portion of the top surface redirects the sensor light into the mirror at such an angle that upon reflection by the mirror it travels towards the second portion of the top surface, and wherein a second portion redirects the reflected sensor towards the detector.

20. The optical device of claim 1, wherein the optical element comprises a plurality of separate pieces comprising a plurality of lenses and a plurality of prisms.

* * * * *